H. P. ROBERTS.
BEATING AND MIXING DEVICE.
APPLICATION FILED AUG. 5, 1911.

1,038,204.

Patented Sept. 10, 1912.

WITNESSES:
M. G. Crozier
Katherine A. Murray

INVENTOR.
Henry P. Roberts
BY Chas. F. Howe
ATTORNEY.

UNITED STATES PATENT OFFICE.

HENRY P. ROBERTS, OF BOSTON, MASSACHUSETTS, ASSIGNOR OF TWO-THIRDS TO HENRY W. MAY, OF SOMERVILLE, MASSACHUSETTS, AND HENRY S. WARNER OF BOSTON, MASSACHUSETTS.

BEATING AND MIXING DEVICE.

1,038,204.   Specification of Letters Patent.   Patented Sept. 10, 1912.

Application filed August 5, 1911. Serial No. 642,455.

*To all whom it may concern:*

Be it known that I, HENRY P. ROBERTS, of Boston, in the county of Suffolk and State of Massachusetts, have invented certain new and useful Improvements in Beating and Mixing Devices, of which the following is a specification.

This invention relates to an improved beating and mixing device.

The object of the invention is to provide a device which shall quickly and most effectively beat up and mix eggs, beverages, and the like, so as to produce a smooth, well blended mixture, in which the ingredients are all finely divided and thoroughly mixed, and the whole mass lightened and aerated.

With the above object in view, the invention consists in a whirling dasher and cutter, which is forced up and down through the liquid or other matter which is being treated.

The invention will be clearly understood from an inspection of the accompanying drawing, in which—

Figure 1:
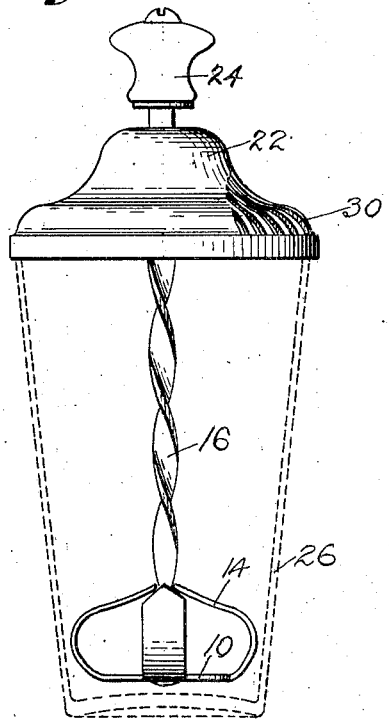
Figure 2:
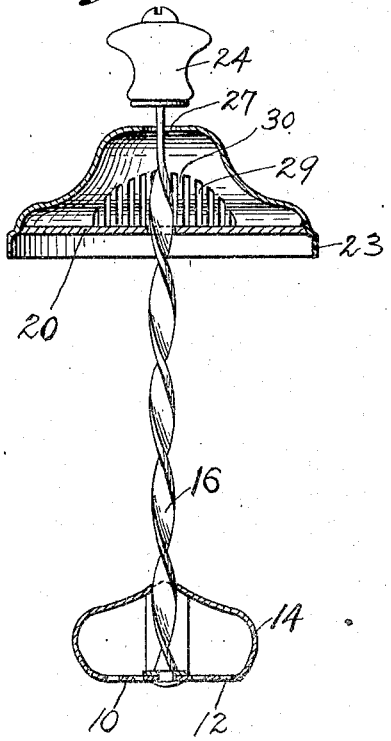
Figure 3:
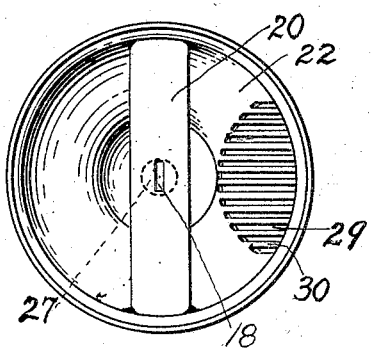
Figure 4:
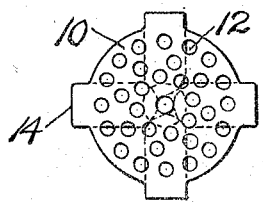

Figure 1 is a view in elevation of the device applied to a beverage dispensing glass, the latter being shown in dotted lines; Fig. 2 is a longitudinal vertical section taken through the line 2—2 in Fig. 1; Fig. 3 is an inverted plan view of the cover; and Fig. 4 is an inverted plan view of the dasher.

As illustrated in the drawings, the invention comprises a substantially circular, foraminous dasher 10, having apertures 12, and provided with a plurality of blades 14, which extend upwardly therefrom at its periphery and are bent inwardly toward the center. The dasher and blades may be made of sheet metal, and are preferably made integral.

The blades are located with their broad sides or faces in their plane of rotation, so that their narrow edges act as rotary cutters to cut up the substances or ingredients contained in the receptacle, while their broad faces act to beat and thoroughly mix the contents of the receptacle by their reciprocatory motion. These blades may be so located and shaped that they come into comparatively close proximity with the walls of the receptacle, as shown in Fig. 1, and when operated, the dasher with its blades constitutes a whirling dasher and cutter.

The dasher 10 is secured to the lower end of a spiral stem 16, which is substantially rectangular in cross-section, and is adapted to pass freely through a guiding aperture 18, formed in a bridge plate or guide 20, which is secured to the under side of a cover 22. The upper end of the stem 16 is provided with an operating knob 24, which is rotatably mounted thereon.

The cover 22 is formed with a flange or lip 23 at its lower edge, which is adapted to fit the exterior of the upper edge of the receptacle 26 in which the substances to be beaten and mixed are contained. This cover is provided at its center with an aperture 27 through which the stem 16 passes. If desired a pouring opening may be provided in the cover above the flange 23, and this opening may be divided into a series of slits 29 by bars 30.

The operation of the device is as follows: The knob 24 is grasped by the operator and reciprocated up and down rapidly. The spiral stem 16 in reciprocating through the rectangular guiding aperture 18 is caused to rotate back and forth, and with it the dasher 10 and the blades 14. The blades by their action operate to cut up and finely divide the material contained in the receptacle 26, and the apertures 12 allow the material to pass back and forth through the dasher, whereby the mass is thoroughly cut up, mixed and aerated, and rendered uniform and smooth in texture.

It will be understood that the receptacle 26 may be of any desired form and size, according to the requirements and uses for which it is intended, and it will also be understood that the pouring opening may be omitted from the cover if desired.

While I have illustrated and described a preferred embodiment of the invention, I am aware that many modifications can be made therein by any person skilled in the art without departing from the scope of the invention as expressed in the claim. Therefore I do not wish to be limited to all the details of construction shown and described, but

What I claim is:—

An article of the character described, comprising a cover, a bridge plate spanning the interior of the cover and provided with a guiding aperture, a spiral stem arranged to be reciprocated through said aperture to give it a rotary motion, and a foraminous dasher affixed to the lower end of said stem provided with integral blades extending radially outward from its periphery, said blades being bent inwardly in proximity to the upper surface of the dasher, substantially as described.

In testimony whereof I have affixed my signature, in presence of two witnesses.

HENRY P. ROBERTS.

Witnesses:
GEORGE W. JACKSON,
CHAS. F. HOWE.